US008276136B2

(12) United States Patent
Schneider (10) Patent No.: US 8,276,136 B2
(45) Date of Patent: Sep. 25, 2012

(54) TRANSPARENT CONFIGURATION OF A NETWORK APPLIANCE

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 784 days.

(21) Appl. No.: 12/001,707

(22) Filed: Dec. 11, 2007

(65) Prior Publication Data

US 2009/0150522 A1    Jun. 11, 2009

(51) Int. Cl.
    *G06F 9/44* (2006.01)
(52) U.S. Cl. ........ 717/170; 709/220; 709/221; 709/222; 717/168; 717/173; 717/174
(58) Field of Classification Search .......... 709/220–222; 713/100; 717/168–173
See application file for complete search history.

(56) References Cited

U.S. PATENT DOCUMENTS

| | | | | | |
|---|---|---|---|---|---|
| 4,954,941 | A | * | 9/1990 | Redman | 717/162 |
| 5,155,837 | A | * | 10/1992 | Liu et al. | 709/221 |
| 5,155,847 | A | * | 10/1992 | Kirouac et al. | 709/221 |
| 5,274,808 | A | * | 12/1993 | Miyao et al. | 717/168 |
| 5,359,730 | A | * | 10/1994 | Marron | 717/169 |
| 5,511,194 | A | * | 4/1996 | Shirakata et al. | 718/104 |
| 5,682,533 | A | * | 10/1997 | Siljestroemer | 1/1 |
| 6,009,274 | A | * | 12/1999 | Fletcher et al. | 717/173 |
| 6,049,671 | A | * | 4/2000 | Slivka et al. | 717/173 |
| 6,070,012 | A | * | 5/2000 | Eitner et al. | 717/168 |
| 6,101,327 | A | * | 8/2000 | Holte-Rost et al. | 717/170 |
| 6,237,092 | B1 | * | 5/2001 | Hayes, Jr. | 713/100 |
| 6,463,584 | B1 | * | 10/2002 | Gard et al. | 717/171 |
| 6,513,115 | B2 | * | 1/2003 | Nock et al. | 713/100 |
| 6,634,025 | B1 | * | 10/2003 | Hauptmann et al. | 717/168 |
| 6,698,017 | B1 | * | 2/2004 | Adamovits et al. | 717/168 |
| 7,188,163 | B2 | * | 3/2007 | Srinivasan et al. | 709/221 |
| 7,234,056 | B2 | * | 6/2007 | Talati et al. | 713/100 |

OTHER PUBLICATIONS

WebHostingResourceKit, Web Hosting Reviews and Tutorials, Apache HTTP Web server configuration Tutorial, http://www.webhostingresourcekit.com/239.html , 2004, 5 pages.

* cited by examiner

*Primary Examiner* — Emmanuel L Moise
*Assistant Examiner* — Sarah Drabik
(74) *Attorney, Agent, or Firm* — Lowenstein Sandler PC (57) ABSTRACT

A method and apparatus for configuring a remotely available service. In one embodiment, the method includes downloading configuration data for the remotely available service while running a current instance of the service, and invoking a new instance of the service without causing a current instance of the service to terminate. The method may further include causing the current instance of the service to continue performing designated operations until the new instance completes initialization using the configuration data and is able to perform the designated operations.

11 Claims, 7 Drawing Sheets

TRANSPARENT CONFIGURATION OF A NETWORK APPLIANCE

TECHNICAL FIELD

Embodiments of the present invention relate to managing network appliances, and more specifically to performing a transparent configuration of a network appliance.

BACKGROUND

Computer networks have become increasingly complex while people have relied on computers coupled to the networks to transmit and fetch information. The computer networks are responsible for transporting information between the computers used in the business as well as allowing users to connect to their work from remote locations. Network monitoring services have been developed to assist in detecting unexpected changes in the devices on the network. A network monitoring service provider may use a network appliance on the customer network to monitor devices on the customer network and send results to the monitoring service provider. The monitoring service provider then analyzes information received from the network appliance and provides alerts and various reports to an administrator of the customer network.

As components of the customer network undergo various changes, the network appliance may need to be reconfigured to get adjusted to these changes. Currently, the network appliance does not perform any monitoring during the reconfiguration process. For large networks with complex infrastructures, the reconfiguration process may be very resource intensive and lengthy, causing a noticeable interruption in the monitoring operations.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for configuring a remotely available service. The remotely available service may be, for example, a monitoring scheduling service running on a network appliance, a job execution scheduling service running on a centralized server, etc. Using an example of a monitoring scheduler running on a network appliance, when the network appliance determines that reconfiguration is needed, the network appliance downloads configuration data from a server. Upon downloading the configuration data, the network appliance invokes a new instance of a monitoring scheduler without causing a current instance of the monitoring scheduler to terminate. The current instance of the monitoring scheduler continues to perform monitoring operations until the new instance of the monitoring scheduler completes its initialization and is ready to take over the monitoring operations. The current instance of the monitoring scheduler then shuts itself down.

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1A:
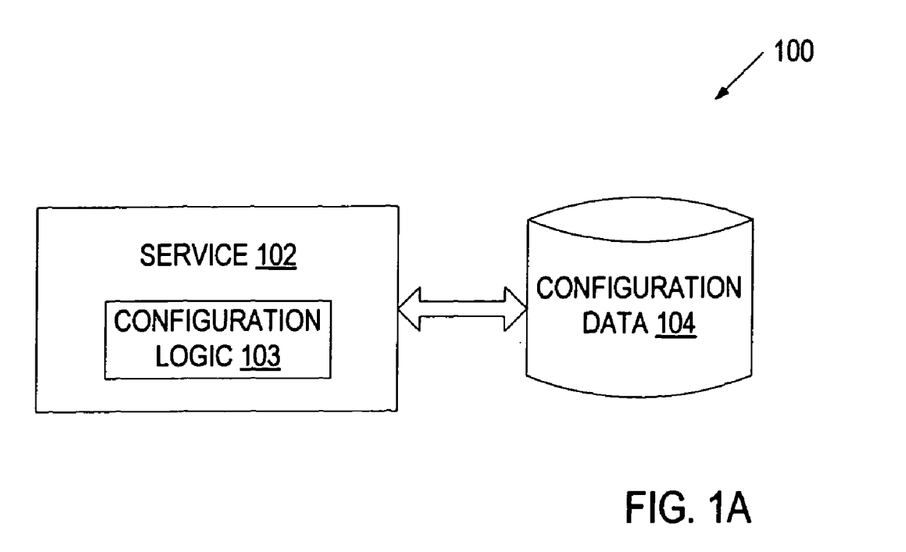
FIG. 1A illustrates an exemplary system for configuring a remotely available service, according to some embodiments of the present invention.

FIG. 1A illustrates an exemplary service configuration system 100 according to some embodiments of the invention. The system 100 may include a service 102 that may run on a server and provide specific functionality to one or more clients. Alternatively, the service 102 may run on a device in a peer-to-peer system and provide specific functionality to other devices in the peer-to-peer system. Yet alternatively, various other configurations can be used with the service 102.

The functionality provided by the service 102 may include, for example, network monitoring, job execution scheduling, user login verification, etc. The functionality provided by the service 102 may be periodically adjusted by reconfiguring the service 102. The reconfiguration may be triggered by an outside request (e.g., in a message received from a server) or by an event detected by the service 102 (e.g., when the number of received messages exceeds a predefined threshold). The reconfiguration is performed transparently without interrupting the operations performed by the service 102. In one embodiment, the service 102 includes a configuration logic 103 that controls reconfiguration of the service 102. In particular, when the configuration logic 103 determines that reconfiguration is needed, it downloads configuration data 104. The configuration data may be downloaded, for example, from a server over a network, from another device in a peer-to-peer system, from a shared storage, etc. The configuration data 104 may include information defining current functionality of the service 102. For example, the configuration data 104 may specify code to perform the current functionality and data needed to execute the code.

The configuration logic 103 stores the configuration data 104 in a data store (e.g., a database, an internal memory, a cache, etc.) residing on a machine hosting the service 102, and invokes a new instance of the service 102 without terminating a current instance of the service 102. The new instance initializes itself using the configuration data 104 while the current instance continues to perform its ongoing operations. When the new instance of the service 102 completes the initialization, it notifies the current instance of the service 102, which then completes its ongoing operations and shuts down, allowing the new instance of the service 102 to take over.

Figure 1B:
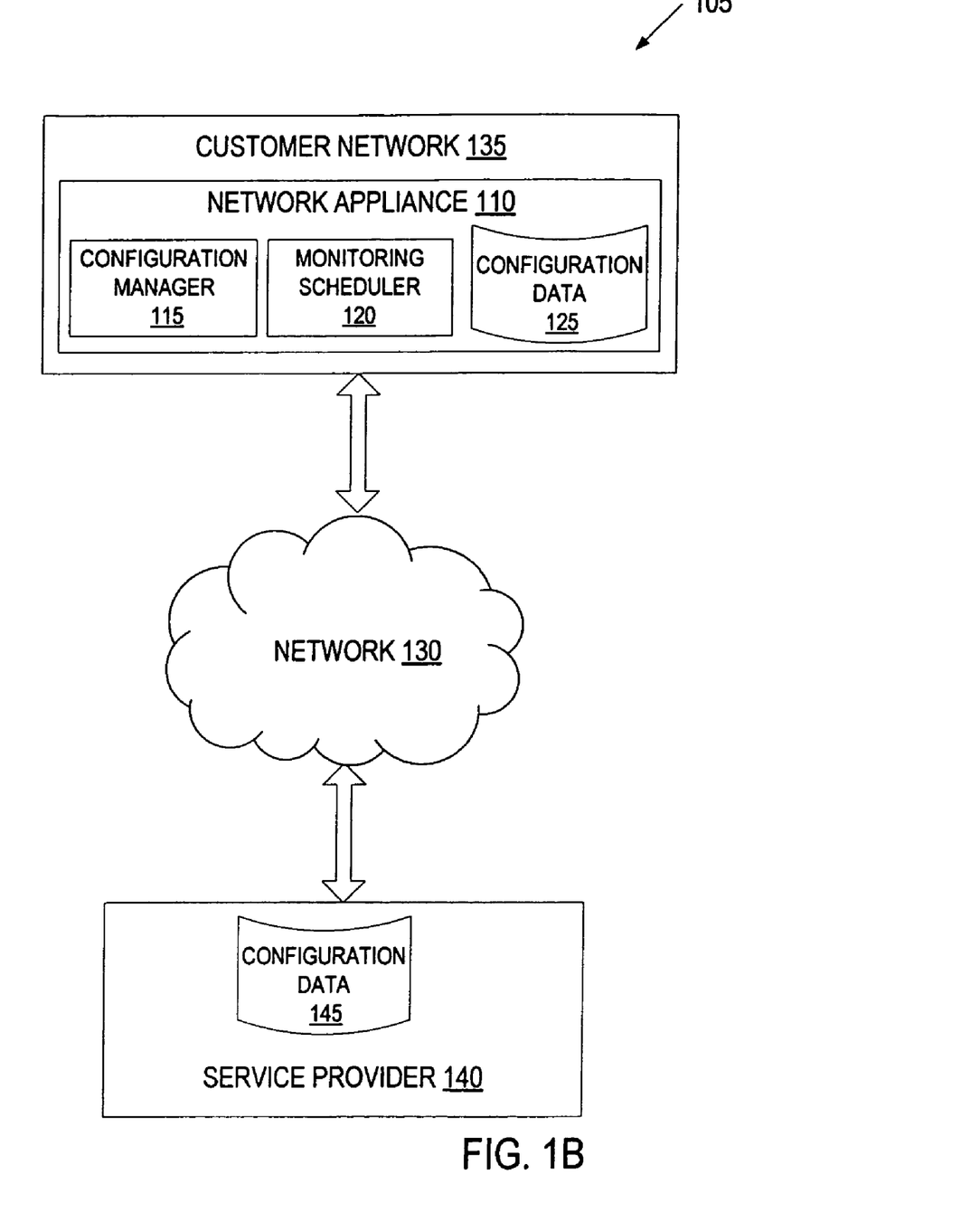
FIG. 1B illustrates an exemplary network architecture in which embodiments of the present invention may operate.

FIG. 1B illustrates an exemplary network architecture 105 in which embodiments of the present invention may operate. The network architecture 105 may include a service provider 140 connected with a customer network 135 (e.g., a local area network (LAN), wide area network (WAN), intranet, etc.) over a public network 130 (e.g., the internet). Alternatively, the customer network 135 may be connected with the service provider 140 via a private network (e.g., an intranet, virtual private network (VPN), etc.).

Referring to FIG. 1B, the customer network 135 may represent a network of an enterprise and may include such devices as desktop computers, laptop computers, network printers, switches, routers, gateways, firewalls, or any other devices having a network address. In one embodiment, the customer network 135 also includes a network appliance 110. The network appliance 110 may be a device that is configurable over a network to perform a network related function (e.g., network monitoring) upon connection with the customer network 135. The network appliance 110 may be a computing device such as, for example, a desktop computer, laptop computer, server, etc.

Service provider 140 provides one or more services to the customer network 135. In one embodiment, the service provider 140 uses the network appliance 110 to collect information about the customer network 135 and devices on the customer network 135. In particular, the network appliance 110 may collect current characteristics of the devices including characteristics of their hardware components, operating systems, databases, network services, applications, websites, etc.

The service provider 140 analyzes the information provided by the network appliance 110, and generates alerts and various reports for users such as IT administrators. The service provider 140 may include one or more servers that communicate with the network appliance 110 and provide back-end functionality such as generating network status updates, performing transactions, etc. The service provider 140 also includes a data store (e.g., a database, a repository, etc.) to store current configuration information 145 for the network appliance 110. The configuration information 145 includes various data defining current functionality of the network appliance 110. For example, the configuration information 145 may specify code for desired monitoring operations and data needed to execute the code.

The service provider 140 may change the functionality of the network appliance 110 by updating the configuration information 145 and requesting reconfiguration of the network appliance 110. In response, the network appliance 110 requests configuration information 145 from the service provider 140, stores it in a local data store 125 (e.g., a database, an internal memory, a cache, etc.), and reconfigures itself using the configuration data 125.

In one embodiment, the network appliance 110 hosts a configuration manager 115 that ensures transparent configuration of the network appliance 110. That is, instead of doing a complete restart of a monitoring scheduler 120, and waiting for the monitoring scheduler 120 to initialize itself using the configuration data 125, the configuration manager 115 initiates a new instance of the monitoring scheduler 120 while allowing a current instance of the monitoring scheduler to run. When the new instance of the monitoring scheduler completes the initialization, it notifies the current instance of the monitoring scheduler, which then completes its ongoing monitoring operations and shuts down, allowing the new instance of the monitoring scheduler to take over the monitoring responsibilities.

By using the two instances, the configuration manager 115 is able to reconfigure the network appliance 110 without interrupting its primary task of monitoring the customer network 135.

Figure 2:
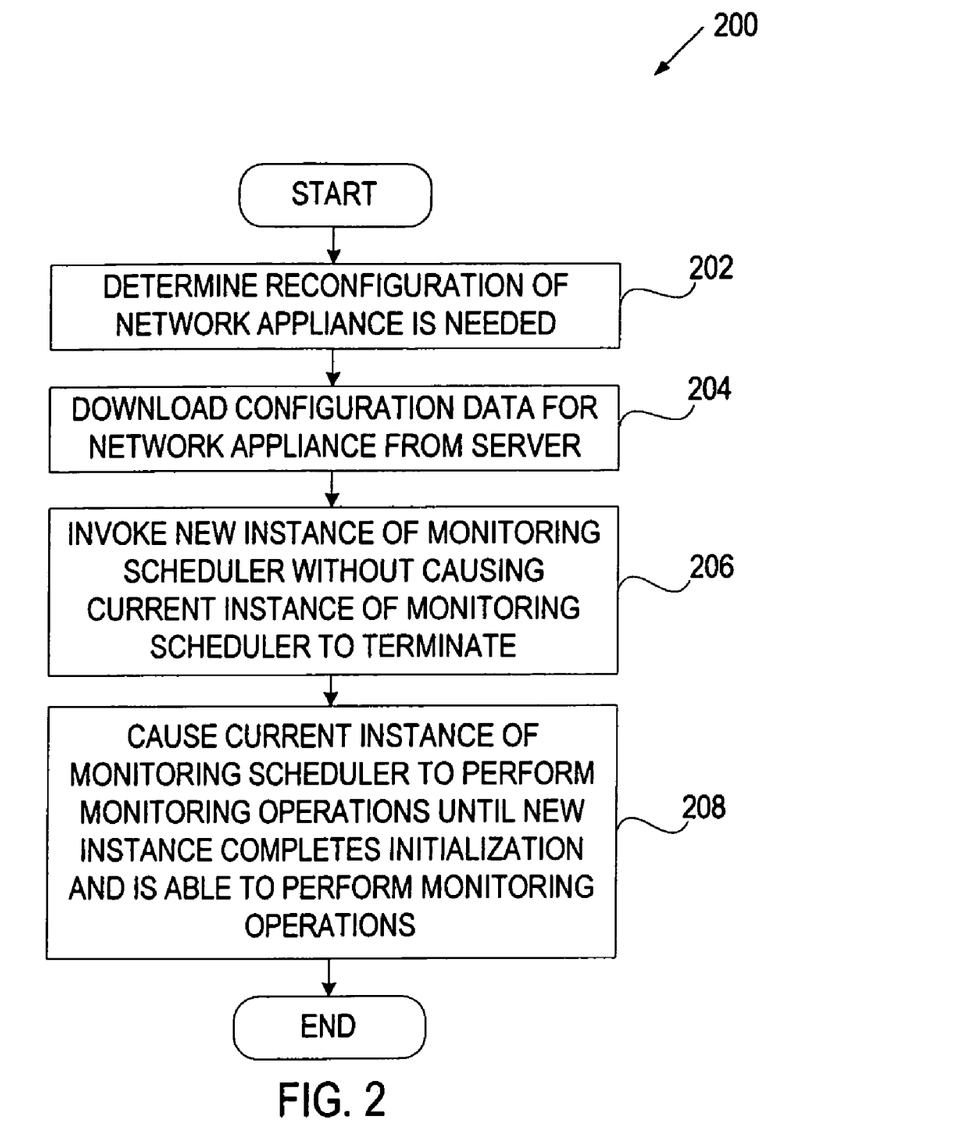
FIG. 2 is a flow diagram of a method for configuring a network appliance, in accordance with one embodiment of the present invention.

FIG. 2 is a flow diagram illustrating one embodiment of a client-based method 200 for configuring a network appliance. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, method 200 is performed by a network appliance, such as network appliance 110 of FIG. 1.

Referring to FIG. 2, method 200 begins with processing logic determining that a reconfiguration of a network appliance is needed (block 202). Processing logic can make this determination upon receiving a request from a server, or upon detecting a predefined condition on the network appliance (e.g., a specific message generated by the operating system). At the time of this determination, the network appliance runs a current instance of a monitoring scheduler that is responsible for performing monitoring operations.

At block 204, processing logic downloads configuration data from a server. When the download is completed, processing logic invokes a new instance of the monitoring scheduler (block 206). Processing logic invokes the new instance of the monitoring scheduler without causing the current instance of the monitoring scheduler to terminate.

The current instance of the monitoring scheduler continues to perform monitoring operations while the new instance initializes itself using the configuration data (block 208). The configuration data may specify pieces of code for various monitoring operations and data required for executing these pieces of code. For example, the configuration data may include a piece of code for monitoring a website maintained by a device on the customer network, and the URL of this website.

When the new instance of the monitoring scheduler completes its initialization, it notifies the current instance of the monitoring scheduler, which then finishes its ongoing monitoring operations and shuts itself down, passing the monitoring responsibilities over to the new instance of the monitoring scheduler.

Figure 3:
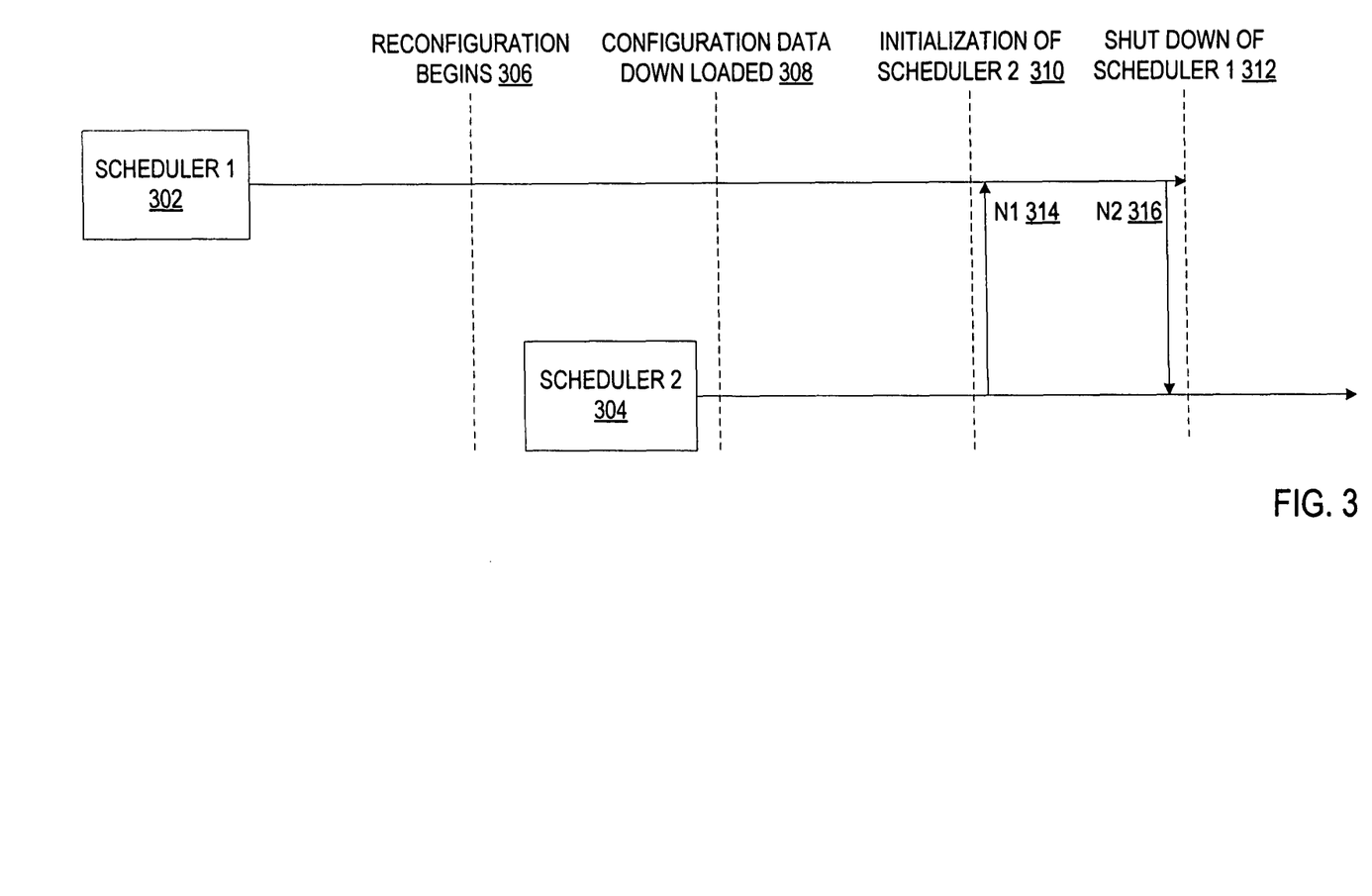
FIG. 3 illustrates the cooperation of two instances of a monitoring scheduler, in accordance with one embodiment of the present invention.

FIG. 3 illustrates the cooperation of two instances of a monitoring scheduler, in accordance with one embodiment of the present invention. Initially, monitoring operations are performed by a first instance (Scheduler 1) 302 of the monitoring scheduler. Scheduler 1 continues to perform the monitoring operations when the network appliance begins reconfiguration 306 and requests configuration data from a server. When the network appliance completes the download 308 of the configuration data, the network appliance invokes a second instance (Scheduler 2) 304 of the monitoring scheduler without terminating Scheduler 1. Once Scheduler 2 is invoked, it begins the initialization process (e.g., loading code for monitoring operations from libraries as specified in the configuration data, adding data for executing the code, etc.). In the meantime, Scheduler 1 continues the monitoring operations.

When the initialization process is completed 310, Scheduler 2 sends a notification (N1) 314 to Scheduler 1. Scheduler 1 receives the notification 314 and responds to it by completing the ongoing monitoring operations. In one embodiment, once these operations are completed, Scheduler 1 sends a notification (N2) 316 to Scheduler 2, and shuts itself down 312, as will be discussed in more detail below in conjunction with FIG. 4A. In another embodiment, Scheduler 1 does not explicitly notify Scheduler 2 about the completion of its operations. Instead, Scheduler 2 estimates the time of completion, checks the state of Scheduler 1 at the estimated time, and terminates Scheduler 1 if it is still running at that time, as will be discussed in more detail below in conjunction with FIG. 4B.

Scheduler 2 receives the notification 316 and starts monitoring the network using the code specified in the new configuration data. In particular, the new configuration data may require some monitoring operations to continue while requiring new monitoring operations (e.g., monitoring a new website) to be added and some of the previously performed monitoring operations (e.g., monitoring a network service that is no longer used) to be removed.

Figure 4A:
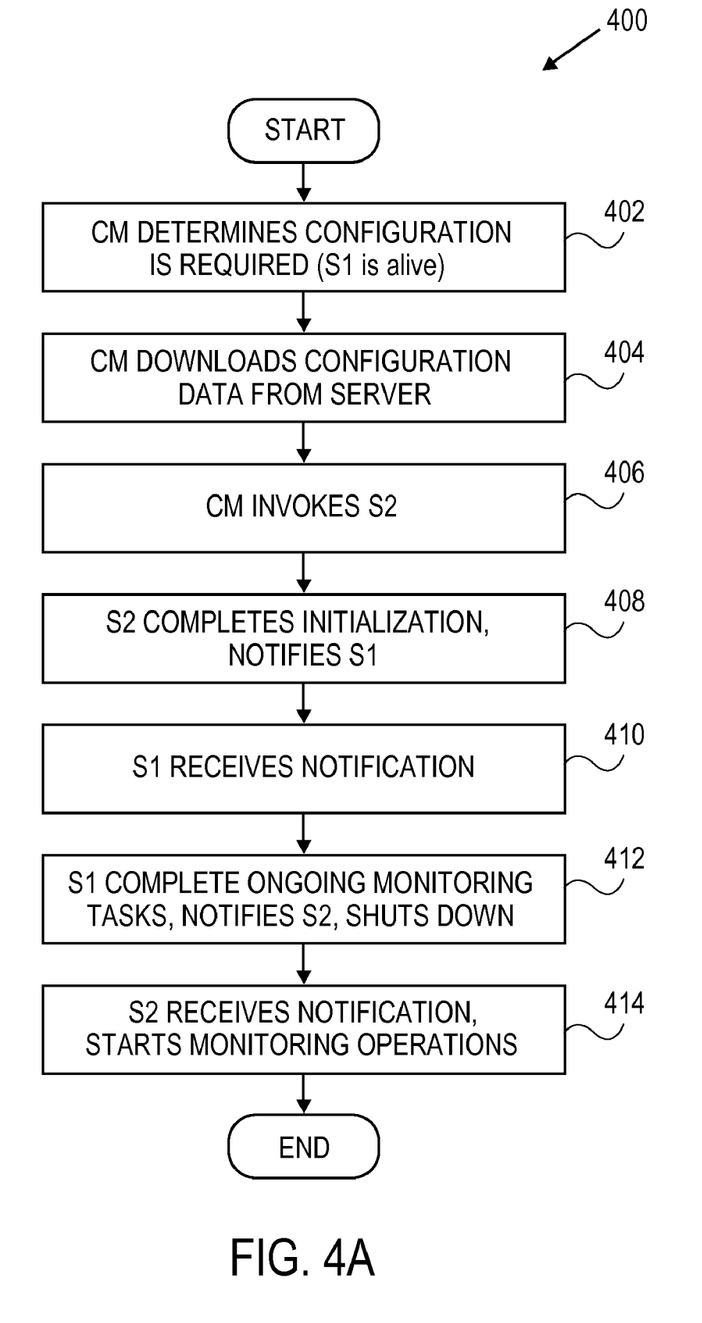
FIGS. 4A and 4B are flow diagrams of a method for performing monitoring operations during a configuration process, in accordance with alternative embodiments of the present invention.
Figure 4B:
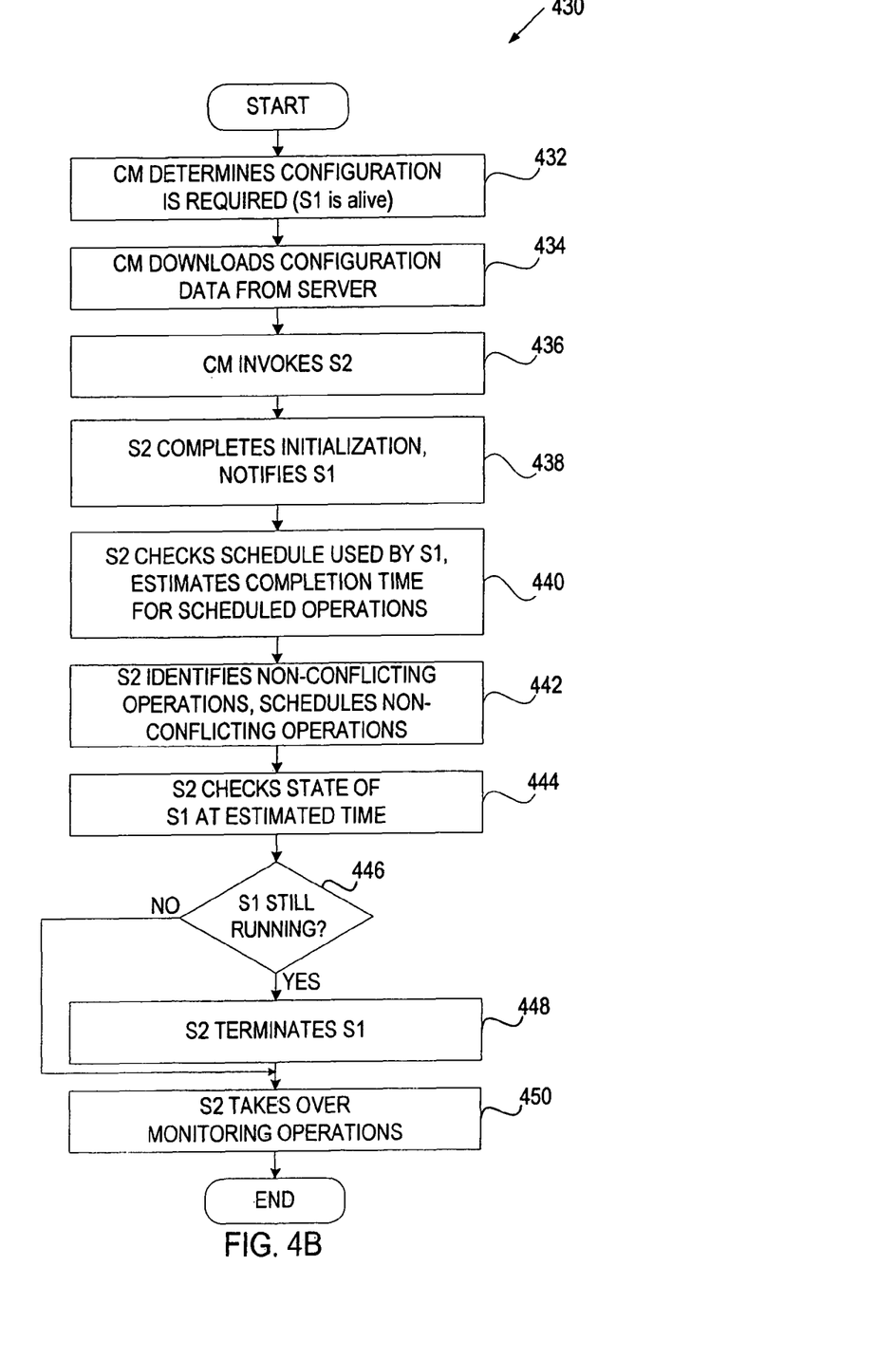

FIGS. 4A and 4B are flow diagrams of a method for performing monitoring operations during a configuration process, in accordance with alternative embodiments of the invention. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method is performed by a network appliance, such as network appliance 110 of FIG. 1.

Referring to FIG. 4A, method 400 beings with a configuration manager 115 (CM) determining that reconfiguration of a network appliance is required (block 402) and downloading configuration data from a server (block 404). Upon downloading the configuration data, the configuration manager 115 invokes a new instance (S2) of the monitoring scheduler without causing the current instance (S1) of the monitoring scheduler to terminate (block 406).

At block 408, the new instance S2 completes the initialization and notifies the current instance S1. The current instance S1 receives the notification (block 410), completes the ongoing monitoring tasks, notifies the new instance S2, and shuts down (block 412). At block 414, the new instance S2 receives the notification of the current instance S1, and takes over the monitoring operations.

Referring to FIG. 4B, method 430 beings with a configuration manager 115 (CM) determining that reconfiguration of a network appliance is required (block 432) and downloading configuration data from a server (block 434). Upon downloading the configuration data, the configuration manager 115 invokes a new instance (S2) of the monitoring scheduler without causing the current instance (S1) of the monitoring scheduler to terminate (block 436).

At block 438, the new instance S2 completes the initialization, and notifies S1 that S1 needs to be shut down upon completing the ongoing operations. At block 440, S2 checks the schedule being used by the current instance S1, and estimates the completion time for the scheduled monitoring operations, assuming that S1 will complete all scheduled operations. At block 442, S2 determines which operations specified in the new configuration data can be run without creating a conflict with the operations currently run by S1, and schedules the non-conflicting operations.

When the estimated time for completing the ongoing operations by S1 is reached, S2 checks the state of S1 (block 444). If S1 is still running (block 446), S2 terminates S1 (block 448) and takes over all monitoring operations (block 450). If S1 is no longer running, S2 proceeds to block 450 directly.

Figure 5:
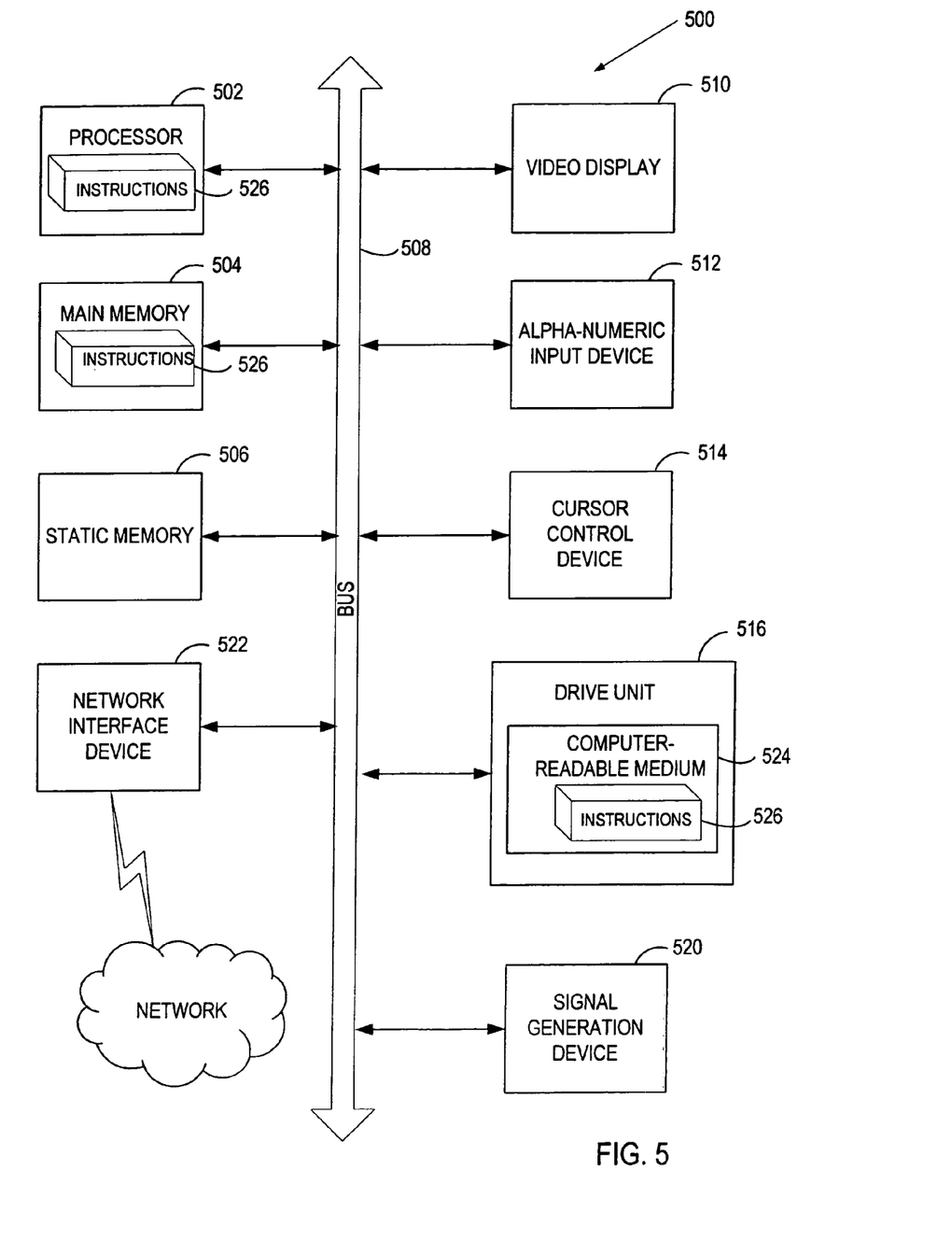
FIG. 5 illustrates a diagrammatic representation of a machine in the exemplary form of a computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 516 (e.g., a data storage device), which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The secondary memory 516 may include a machine-readable storage medium (or more specifically a computer-readable storage medium) 524 on which is stored one or more sets of instructions (e.g., software 526) embodying any one or more of the methodologies or functions described herein. The software 526 may also reside, completely or at least partially, within the main memory 504 and/or within the processing device 502 during execution thereof by the computer system 500, the main memory 504 and the processing device 502 also constituting machine-readable storage media. The software 526 may further be transmitted or received over a network via the network interface device 522.

While the machine-readable storage medium 524 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer implemented method comprising:
receiving, by a network appliance device, a request to reconfigure a remotely-available service executing on the network appliance device;
obtaining, by the network appliance device, configuration data for reconfiguring the remotely-available service from a server;
invoking, by the network appliance device in response to obtaining the configuration data~a new instance of the remotely-available service on the network appliance device, the new instance to initialize by using the configuration data;
during the invoking of the new instance of the remotely-available service, maintaining, by a current instance of the remotely-available service, operations associated with the remotely-available service;
when the configuring of the new instance of the remotely-available service is completed, estimating, by the new instance of the remotely-available service, a time of completion of the operations executing on the current instance of the remotely-available service;
checking, by the new instance of the remotely-available service, a state of the current instance of the remotely-available service at the estimated time of completion;
terminating, by the new instance of the remotely-available service, execution of the current instance of the remotely-available service if the current instance is running at the estimated time of completion; and
continuing, by the new instance of the remotely-available service, the operations associated with the remotely-available service.

2. The method of claim 1 wherein:
the remotely-available service is a monitoring scheduler running on the network appliance device;
the configuration data is downloaded from the server via a network; and
the operations comprise monitoring operations.

3. The method of claim 2 wherein the current instance of the monitoring scheduler receives a notification of the new instance of the monitoring scheduler, completes ongoing monitoring operations, and shuts down.

4. The method of claim 2 wherein:
the configuration data specifies code to be executed for the monitoring operations and data required for executing the code; and
the monitoring operations are directed to components of a plurality of devices on a network, the components comprising one or more of hardware components, operating systems, databases, network services provided by the plurality of devices, applications running on the plurality of devices, or websites maintained by the plurality of devices.

5. A non-transitory computer-readable storage medium including instructions that, when executed by a first machine, cause the first machine to perform a method comprising:
receiving, by a network appliance device, a request to reconfigure a remotely-available service executing on the network appliance device;
obtaining, by the network appliance device, configuration data for reconfiguring the remotely-available service from a server;
invoking, by the network appliance device in response to obtaining the configuration data, a new instance of the remotely-available service on the network appliance, the new instance to initialize by using the configuration data;
during the invoking of the new instance of the remotely-available service, maintaining, by a current instance of the remotely-available service, operations associated with the remotely-available service;
when the of the new instance of the remotely-available service is completed, estimating, by the new instance of the remotely-available service, a time of completion of the operations executing on the current instance of the remotely-available service;

checking, by the new instance of the remotely-available service, a state of the current instance of the remotely-available service at the estimated time of completion;

terminating, by the new instance of the remotely-available service, execution of the current instance of the remotely-available service if the current instance is running at the estimated time of completion; and continuing, by the new instance of the remotely-available service, the operations associated with the remotely-available service.

6. The non-transitory computer-readable storage medium of claim 5 wherein:

the remotely-available service is a monitoring scheduler running on the network appliance device;

the configuration data is downloaded from the server via a network; and the operations comprise monitoring operations.

7. The non-transitory computer-readable storage medium of claim 6 wherein the current instance of the monitoring scheduler receives a notification of the new instance of the monitoring scheduler, completes ongoing monitoring operations, and shuts down.

8. The non-transitory computer-readable storage medium of claim 6 wherein:

the configuration data specifies code to be executed for the monitoring operations and data required for executing the code; and the monitoring operations are directed to components of a plurality of devices on a network, the components comprising one or more of hardware components, operating systems, databases, network services provided by the plurality of devices, applications running on the plurality of devices, or websites maintained by the plurality of devices.

9. A network appliance apparatus, comprising:

a memory;

a processing device communicably coupled to the memory, the processing device to execute a remotely-available service on the network appliance apparatus;

a configuration manager executable from the memory by the processing device, the configuration manager configured to:

receive a request to reconfigure the remotely-available service executing on the network appliance apparatus;

download configuration data for re-configuring the remotely-available service from a server;

invoke, in response to downloading the configuration data, a new instance of the remotely-available service on the network appliance apparatus, the new instance to initialize by using the configuration data; and maintain, by a current instance of the remotely-available service during the invocation of the new instance of the remotely-available service, operations associated with the remotely-available service;

when configuration of the new instance of the remotely-available service is completed, estimating, by the new instance of the remotely-available service, a time of completion of the operations executing on the current instance of the remotely-available service;

checking, by the new instance of the remotely-available service, a state of the current instance of the remotely-available service at the estimated time of completion;

terminating, by the new instance of the remotely-available service, execution of the current instance of the remotely-available service if the current instance is running at the estimated time of completion; and continuing, by the new instance of the remotely-available service, the operations associated with the remotely-available service.

10. The apparatus of claim 9 wherein the current instance of the remotely-available service is to receive a notification of the new instance of the remotely-available service, to complete ongoing monitoring operations, and to shut down.

11. The apparatus of claim 10 wherein:

the configuration data specifies code to be executed for the monitoring operations and data required for executing the code; and the monitoring operations are directed to components of a plurality of devices on a network, the components comprising one or more of hardware components, operating systems, databases, network services provided by the plurality of devices, applications running on the plurality of devices, or websites maintained by the plurality of devices.

* * * * *